United States Patent [19]

Dagna et al.

[11] Patent Number: 4,485,386

[45] Date of Patent: Nov. 27, 1984

[54] INK JET DOT PRINTER

[75] Inventors: Giandomenico Dagna, Ivrea; Enrico Manini, Camandona; Giorgio Tadini, Turin, all of Italy

[73] Assignee: Ing. C. Olivetti & C., S.p.A., Ivrea, Italy

[21] Appl. No.: 397,770

[22] Filed: Jul. 13, 1982

[30] Foreign Application Priority Data

Aug. 4, 1981 [IT] Italy .............................. 68093 A/81

[51] Int. Cl.[3] .............................................. G01D 15/18

[52] U.S. Cl. .................................. 346/75; 346/140 R

[58] Field of Search .................... 346/140 PD, 75, 1.1; 400/126

[56] References Cited

U.S. PATENT DOCUMENTS

| | | | |
|---|---|---|---|
| 4,059,183 | 11/1977 | Hoskins | 346/75 |
| 4,095,238 | 6/1978 | Kattner et al. | 346/140 PD |
| 4,343,013 | 8/1982 | Bader et al. | 346/140 PD |
| 4,364,060 | 12/1982 | Jinnai et al. | 346/75 |
| 4,368,477 | 1/1983 | Heinzl et al. | 346/140 PD |
| 4,374,388 | 2/1983 | Heinzl | 346/1.1 |
| 4,380,771 | 4/1983 | Takatori | 346/1.1 X |

*Primary Examiner*—A. D. Pellinen

*Assistant Examiner*—Todd E. DeBoer

*Attorney, Agent, or Firm*—Banner, Birch, McKie & Beckett

[57] ABSTRACT

The ink jet dot printer comprises a head mounted on a carriage movable along a platen supporting the paper and is formed by a plurality of tubes and piezoelectric transducer for ejecting the ink, which are supported by two parallel plates spaced from one another, between which a polymerizable resin is cast to form a single block. The tubes are aligned in a single row F—F' in a direction inclined with respect to the printing line, in such manner that the distance between the extreme tubes measured perpendicularly to the printing line is equal to the maximum height of the characters. On the outside of the front plate supporting the tubes there is fixed a thin plate bearing a row of nozzles, each of which is aligned with the corresponding ejector tube. The expulsion of the drops of ink is obtained by means of the compression exerted on the tubes by the piezoelectric transducers activated in parallel by electric pulses generated by an energizing circuit under the control of a driving logic circuit by means of which it is possible to vary the slope of the printed characters and obtain bidirectional printing at high speed.

20 Claims, 7 Drawing Figures

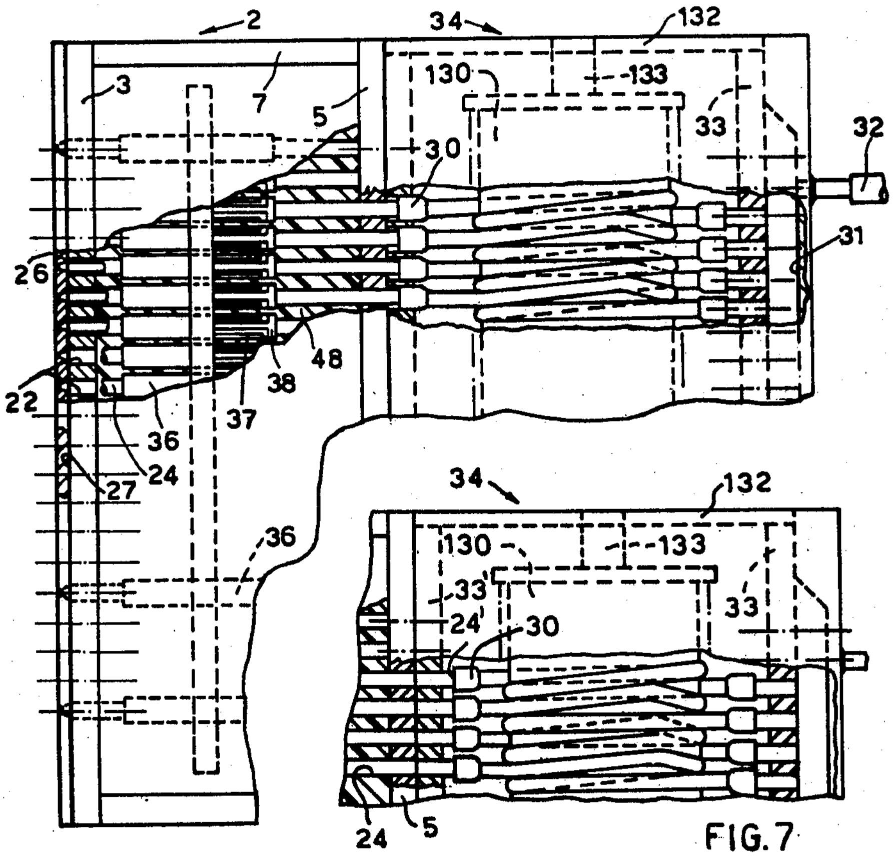
FIG. 2
FIG. 7
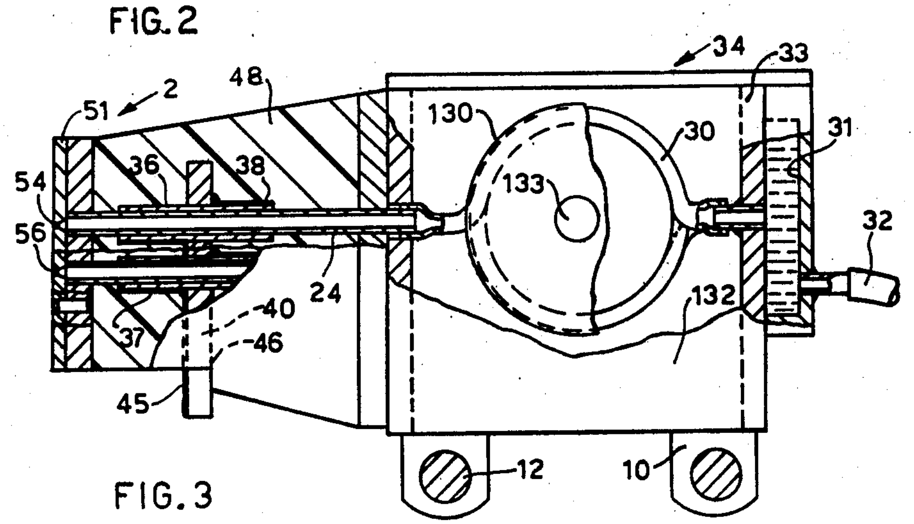
FIG. 3

INK JET DOT PRINTER

BACKGROUND OF THE INVENTION

The present invention relates to an ink jet dot printer comprising a head mounted on a carriage movable with respect to a support for the printing paper and having a plurality of tubes for ejecting the ink, each tube having a piezoelectric transducer for expelling a drop of ink through a corresponding nozzle in response to a predetermined electric signal.

An ink jet printing head is known in which the ducts containing the ink are obtained in a single block of resin and converge towards a matrix of nozzles aligned vertically in a plate fixed rigidly to the block of resin. The expulsion of the drops of ink is produced by piezoelectric sleeves embedded in the resin coaxially with each duct.

The construction of such a head proves very complex and costly because of the use of moulding cores for forming the ducts, which must be extracted after hardening of the block of resin, with a consequent danger of scoring of the internal surface of the ducts. Moreover, in the event of blockage of one or more nozzles, it is necessary to replace the head, with a consequent loss of time for aligning the new head on the carriage.

The object of the invention is to produce an ink jet printing head of simple construction and high performance which obviates the above-mentioned disadvantages.

A further object of the invention is to provide a driving circuit for the ink jet head, by means of which it is possible to print the characters with a slope which is variable both forward and backward with respect to the vertical.

SUMMARY OF THE INVENTION

This problem is solved by the ink dot printer according to the invention, which comprises a head mounted on a carriage movable with respect to a support for the paper and having a plurality of tubes for ejecting the ink, each tube being provided with a piezoelectric transducer selectively activable for expelling a drop of ink through a corresponding nozzle in predetermined printing positions in response to an electric signal, and which is characterized in that the tubes are parallel to one another and lie in a plane so inclined with respect to the movement of the carriage that the distance between the first and the last tubes, measured perpendicularly to the movement of the carriage, is equal to the maximum height of the characters to be printed.

BRIEF DESCRIPTION OF THE DRAWINGS

The invention will be described in more detail, by way of example, with reference to the accompanying drawings, in which:

FIG. 2 is a plan view, partly in section, of a head used on the printer of FIG. 1;

FIG. 3 is a side view, partly in section, of the head of FIG. 2;

FIG. 7 is a partial section of a modified form of the head of FIG. 2.

DESCRIPTION OF THE PREFERRED EMBODIMENT

Figure 1:
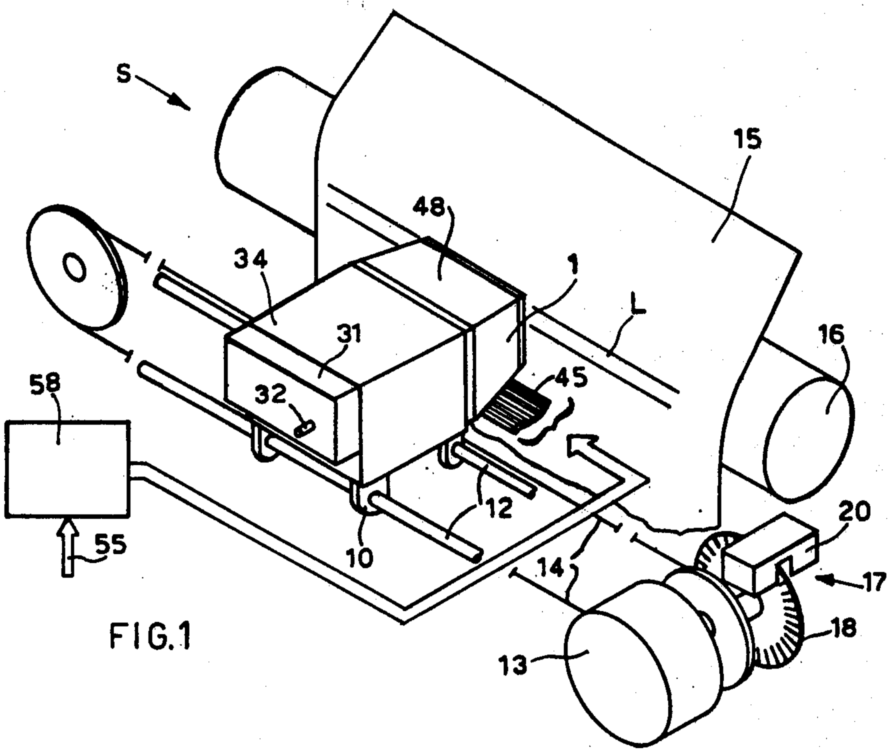
FIG. 1 is a diagrammatic perspective view of an ink jet dot printer according to the invention.

Referring to FIG. 1, the printer S comprises a head 1 mounted on a carriage 10 moved along guides 12 by an electric motor 13 by means of a cable 14. The head 1 is formed by a rigid structure 2 (FIGS. 2 and 3) consisting of a front plate 3 and a rear plate 5 which are parallel to one another and kept spaced apart by two side members 7,9.

The head 1 can print in both directions along a printing line L (FIG. 1) on a carrier 15 passed around a platen 16. A synchronizing device 17 of known type, constituted, for example, by a strobe disc 18, keyed on the shaft of the motor 13, and a photoelectric transducer 20, is used to generate strobe signals for synchronizing the printing with the movement of the head.

More particularly, as is known, the timing device 17 generates the clock signals as a function of the position of the head along the printing line L and, therefore, the clock signals are independent of the speed of the head itself. By way of example, it is assumed that the synchronizing device 17 generates forty-two clock pulses while the head 1 shifts by a distance equal to the pitch p (FIG. 4) between two adjacent nozzles.

In each of the plates 3 and 5 there is formed a row of holes 22, for example twenty holes, which is inclined with respect to the direction of the movement of the carriage 10, each hole in the plate 3 being aligned with the corresponding hole in the plate 5. The holes 22 are equidistant by the pitch "p", measured in the direction of the movement of the carriage 10. Into each pair of corresponding holes 22 there are introduced cylindrical tubes 24 adapted to contain ink which is to be expelled in the form of drops by a known technique, as will be described hereinafter. All the tubes 24 lie in a plane having the course F'-F' indicated by a chain-dotted line in FIG. 4 and the inclination of which is such that the distance between the first and the last hole of the row, measured perpendicularly to the direction of the movement of the carriage 10, is equal to the maximum height of the characters printed on the paper 15. The tubes 24 are firmly fixed in the holes 22 of the plates 3 and 5 by cementing with a resin, for example an epoxy resin, in such manner that the front end 26 thereof is positioned level with the outer surface 27 of the plate 3.

The tubes 24 project from the rear plate 5 by a certain length to permit their connection by means of the tubes 30 to an auxiliary ink reservoir 31 connected in turn by means of a flexible tube 32 to a main reservoir not illustrated in the drawings. The auxiliary reservoir 31 is fixed at the rear of the carriage 10 on a wall 33 of a parallelepipedal container 34 for protecting the tubes 30.

Inside the container 34, the tubes 30, which are of flexible material, are supported by a cylindrical drum 130 fixed to the side walls 132 of the container 34 by means of a shaft 133 coaxial with the drum 130. Each flexible tube 30 is wound around the outer surface of the drum 130 for one and a half turns, inasmuch as it begins and ends, respectively, in two diametrically opposite positions with respect to the drum 30.

Moreover, for the purpose of minimizing the space occupied by the tubes 30 in the axial direction on the drum 130, the flexible tubes 30 are wound around it alternately in opposite directions, whereby each half turn of the winding coil left free by one of the tubes 30 is occupied by the first half turn of the adjacent tube.

In this way, for each pair of tubes 30 only three turns are used on the drum 130, occupying, that is, a space in the axial direction equal to three diameters of the tubes 30, so that a total of thirty turns are necessary in all for the twenty tubes 30.

In addition to optimizing the utilization of the space in the container 34, this arrangement of the tubes 30 serves to prevent knocks between the tubes 30 caused by the forces of inertia generated by the movement of the carriage 10 (FIG. 1) at the stops and starts of the carriage.

The tubes 24 may be of chemically inert material such as, for example, glass or ceramic, but they may also be of metal, for example stainless steel or nickel. On the tubes 24 (FIG. 3), piezoelectric transducers 36 in the form of sleeves are cemented approximately half way along the tubes, the transducers being adapted to contract radially under the effect of an electric voltage pulse applied to them.

Figure 4:
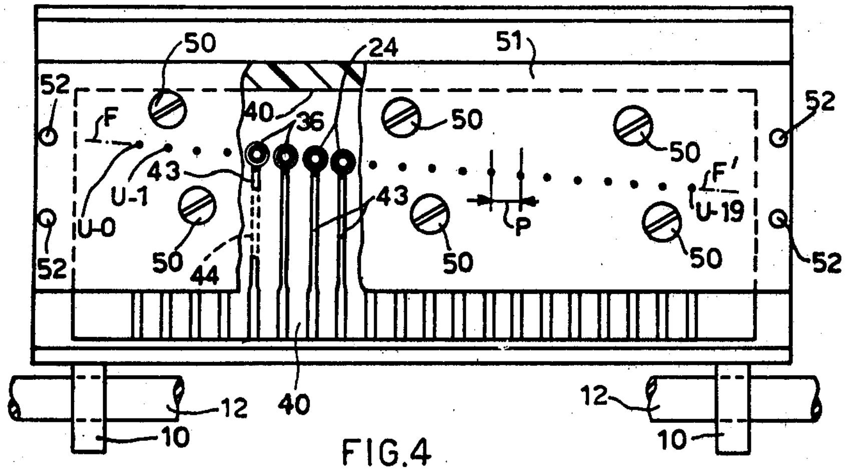
FIG. 4 is a front view, partly in section, of the head of FIG. 2.

To this end, the inner and outer surfaces of the sleeves 36 are covered by two electrodes 37 and 38, respectively, the electrode 37 being brought over onto the outer surface of the sleeve to facilitate electrical connection. A printed circuit board 40 is located between the plates 3 and 5 and is traversed by the sleeves 36. The electrodes 37 and 38 are soldered to corresponding tracks 43 and 44 lying on the faces 45 and 46, respectively, of the board 40 (FIG. 4). The plate 40 projects at the bottom from the head (FIGS. 3, 4) to permit electrical connection by means of a connector not shown in the drawings.

Inside the structure 2 there is cast a resin polymerizable at room temperature and of low shrinkage, for example an epoxy resin, to form a single block 48 enclosing all the tubes 24 and the corresponding sleeves 36.

When hardening has taken place, the block of resin 48 establishes a rigid and continuous connection between the plates 3 and 5, preventing the vibrations of each tube being transmitted through the plates to the adjacent tubes. Moreover, the block of resin 48 constitutes a reliable protection for the extremely fragile tubes 24 against possible knocks or shocks.

Mounted removably against the outer face 27 of the front plate 3 by means of screws 50 is a lamina 51 with a thickness less than that of the plate 3 and in which there are formed twenty nozzles $U_0 \ldots U_{19}$, each of which is disposed in perfect alignment with respect to the corresponding tube 24. The alignment of the nozzles U with the respective tubes 24 is ensured by locating pins 52 fixed to the plate 3 and engaged in holes 53 in the lamina 51. In this way, the lamina 51 can be separated easily from the plate 3 to permit cleaning of the nozzles in the event of any of them becoming blocked because of drying of the printing ink. Each nozzle U is formed by an orifice 54 of cylindrical form of a diameter between 50 and 90 μm, and a conically flared portion 56 connecting the orifice 54 with the inner diameter of the tubes 24, which is of the order of 0.8 mm.

As already mentioned before, a drop of ink can be expelled from each nozzle U by the effect of the compression exerted by the corresponding transducer 36 when energized by a voltage pulse. All the transducers 36 are electrically connected through the medium of the printed circuit board 40 and a 20-wire cable 45 indicated diagrammatically in FIG. 1 to an energizing unit 58 of known type and not described in detail, which is able to energize selectively in parallel any or all of the twenty transducers 36. The energizing unit 58 receives in parallel on a bus 55 a string of twenty bits corresponding to the dots which are to be printed simultaneously by the twenty nozzles U. The printing bits are processed by a driving logic circuit 60 illustrated in FIG. 5, which comprises a read/write memory 62 with 1024 address locations.

The memory 62 is connected through a bus 64 to a latch 66 for temporary storage of the memory addresses which arrive on a bus 68 from an address multiplexer 70 driven directly by a microprocessor control unit 72 through a bus 74. An adder 76 executes at each cycle a shift by a predetermined number K of places to permit the multiplexer 70 to address correctly the information stored in the memory 62, in accordance with a procedure described later on.

The number K may correspond to the number of dots printable in the pitch "p" between two adjacent nozzles but it can assume any selected value. A manual entering device 80, for example a switch with a plurality of sections, is connected to the adder 76 through the medium of a bus 77 and enables the selected number K to be forced into the adder 76 in known manner.

Through a bus 73, the controller 72 addresses a character generator 82 which contains the characters to be printed in columns of dots in accordance with a predetermined matrix. The characters to be printed are extracted from a line memory known per se which is connected to the controller 72 and not shown in the drawings. The generator 82 is connected via a bus 83 to the memory 62 for storing in succession the information appertaining to the columns of dots of the characters to be printed.

Figure 5:
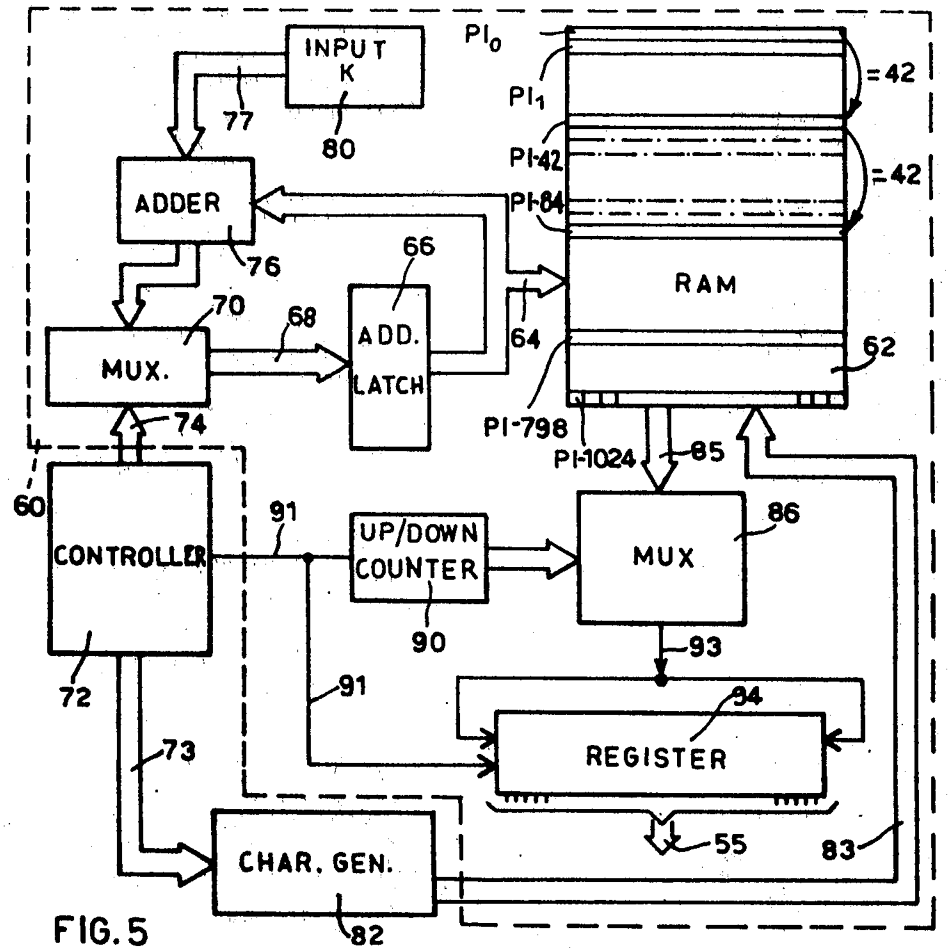
FIG. 5 is a block diagram of a driving logic circuit of the printer of FIG. 1.
Figure 6:
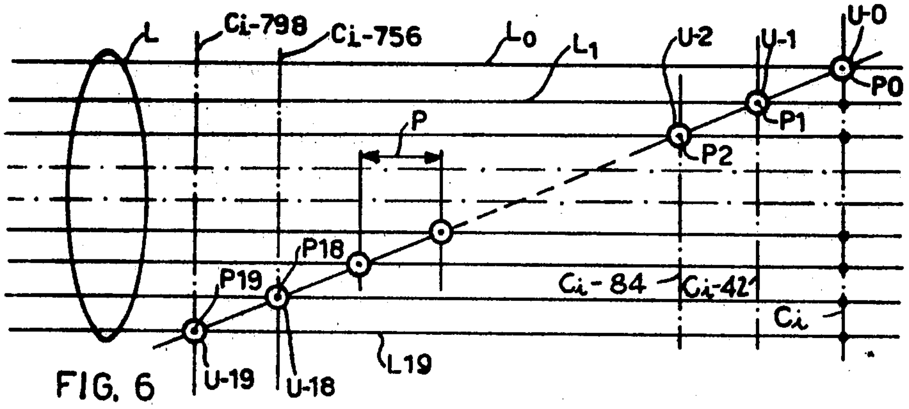
FIG. 6 is a diagrammatic representation of the printing process obtained with the circuit of FIG. 5.

The memory 62 is constituted by 1024 address locations or positions $PI_0, \ldots PI_1, \ldots PI_{1024}$ with cyclic updating (FIG. 5). In each address position $PI_i$ there are stored the twenty bits relating to the dots of each column of the matrix of the character, which is formed in the present case by twenty rows $L_0, L_1, \ldots L_{19}$ (FIG. 6) (there being twenty nozzles) and a predetermined number of columns, for example forty-eight. The memory 62 is connected through a bus 85 to an output multiplexer 86 for reading the bits corresponding to the twenty nozzles of the head 1. The multiplexer 86 is driven by an up/down counter 90, according to the direction of printing, which is adapted to count cyclically up to twenty, for successively transferring the bits of the dots to be printed, which are read out of the memory 62, by means of a wire 93 to a bidirectional/-shift register 94 having twenty locations and of the serial input and parallel output type. The counting direction of the counter 90 and the shift register 94 is supplied by the controller 72 on a wire 91 on the basis of the desired direction of printing. The register 94 is connected through the bus 55 to the energizing unit 58 (FIG. 1) for transferring all the bits corresponding to the twenty nozzles U thereto in parallel on the basis of an enabling signal transmitted by the controller 72, in synchronism with the clock signal generated by the synchronizing device 17 (FIG. 1). Accordingly, as already mentioned, while the head 1 shifts by one pitch "p", there will be forty-two printing energizations.

When the head 1 is located in a generic position along the printing line L (FIGS. 1 and 6), the first nozzle $U_0$ will print the dot $P_0$ of a generic column of dots $C_i$ on a line $L_0$, the second nozzle will print the dot $P_1$ corresponding to a column $C_{i-42}$ shifted by forty-two printing positions with respect to the column $C_i$, and so on, the nozzle $U_{18}$ will print the dot $P_{18}$ of the column $C_{i-756}$ and finally the nozzle $U_{19}$ will print the dot $P_{19}$ belonging to the column $C_{i-798}$, that is shifted back with respect to the direction of movement of the carriage 10 by 798 printing positions with respect to the first column $C_i$.

Taking it that, before beginning printing, the memory 62 is completely erased, the controller 72, addressing the location $PI_0$ of the memory 62 through the medium of the multiplexer 70 and the latch 66, writes in that location the information appertaining to the column $C_i$ prepared by the character generator 82. In this stage, the counter 90 enables the output multiplexer 86 to extract the bit corresponding to the first nozzle $U_0$ from the address position of the first column of dots $C_i$ and to load it into the register 94. Then, assuming K=42, that is equal to the number of printing positions contained in a pitch "p", the controller 72 causes the latch 66 to change over via the address multiplexer 70 to a memory location PI-42 set back by 42 positions with respect to the preceding one to address therein the information appertaining to the column $C_{i-42}$ corresponding to the second nozzle $U_1$ and previously stored in the memory 62 in a stage similar to that hereinbefore described. The shifting by K=42 positions is executed by the adder 72, which adds the number K, entered on the switch 80, to the serial number of the preceding address.

The counter 90 is incremented or decremented by one so that the multiplexer 86 extracts the bit corresponding to the second nozzle $U_1$. This procedure will be repeated by degrees for all the twenty nozzles U. More particularly, the bit corresponding to the twentieth nozzle will be extracted from the last address location $PI_{798}$, corresponding to the column $C_{i-798}$.

In the end, in the register 94 there will be arranged serially in columns the twenty printing bits read in the memory 62, which represent the complete information which will be sent in parallel to the energizing unit 58 (FIG. 1) for printing.

After the head 1 has shifted to the right by forty-two printing positions, for example, the second nozzle $U_1$ has been brought onto the column $C_i$, which belonged before to the first nozzle $U_0$, the third nozzle $U_2$ has been brought onto the column $C_{i-42}$, and so on, and the last nozzle $U_{19}$ has been brought into vertical alignment on the penultimate column $C_{i-756}$.

Finally, after the head has shifted by 798 printing positions, the nozzle $U_{19}$ will be in vertical alignment on the column $C_i$, which will be printed completely with the twenty dots belonging to it. Proceeding in a similar manner, all the columns of dots will be printed in this way and will form a complete row of vertically printed characters.

The driving circuit of FIG. 5 enables the slope of the printed characters to be varied in one direction or the other with respect to the vertical by a simple operation. To vary the slope of the printed characters, it is sufficient to vary the number K forced into the adder 76 by means of the switch 80.

By entering a number K' less than K, a forward slope of the characters will be obtained, which will be all the more pronounced the more K' differs from K. On the other hand, in similar manner, a backward slope of the characters will be obtained by entering a number K'' greater than K. In fact, let us suppose that we enter a number K'=41 by means of the switch 80. In this situation, the multiplexer 86 will read the information of the column of dots corresponding to the second nozzle $U_1$ in an address location in the memory 62 shifted by 41 locations, whereby the second nozzle $U_1$ will print the dots in positions advanced by one step with respect to the preceding state. In a similar manner, all the other nozzles $U_2$, $U_3$, ... $U_{19}$ will print their dot in a position advanced respectively by one, two, .... nineteen printing positions with respect to the normal state. In this way, an alignment of the dots of each printed column which is sloped forward will be obtained. In a completely similar manner, a backward slope of the columns of printed dots will be obtained if K is taken as greater than 42.

The printing speed can be considerably increased due to the cyclic updating of the memory 62. In fact, as already described hereinbefore, the information relating to the columns of dots of the characters to be printed is stored in the memory 62 in cyclic succession; simultaneously, the output multiplexer 86 extracts successively from each column just stored a bit corresponding to the dot to be printed by means of each of the twenty nozzles of the head. In consequence, due to the simultaneousness of the writing and reading of the information in the memory 62, the speed of loading of the register 94 by the multiplexer 86 is considerably increased. As a result, the printing speed of the nozzles can also be increased up to values such as to be able to turn to account the maximum frequency of repetition of the emission of drops of ink by each piezoelectric element.

Among many possible modifications, we mention that the number K selected to vary the slope of the characters may be entered directly from the controller 72 instead of through the switch 80 (FIG. 5). In this case, the number K selected is forced directly by the controller 72 into the adder 76 on the basis of predetermined instructions processed by the controller in response to predetermined commands received in known manner. Consequently, the entering device 80 in FIG. 5 is eliminated and the bus 77 is connected between the controller 72 and the adder 76.

Moreover, in order to facilitate the operations of mounting and removal of the head of FIGS. 1 and 2, the tubes 24 can be cut so as not to project from the rear plate 5 (FIG. 7). Small pieces of tubing 24' projecting inside the container 34 are cemented through the front plate 33' of the container 34. The tubes 30 are fitted over these small pieces 24'. In this way, the container 34 can be separated from the block 48 without having to slip the tubes 30 off the tubes 24. The plate 33' of the container 34 is fixed rigidly by means of screws and locating pins, not shown in the drawing, so as to ensure registration between the tubes 24 and 24'.

We claim:

1. An ink jet dot printer comprising a head mounted on a carriage movable with respect to a printing support and having a plurality of ejecting tubes parallel to one another and in an inclined plane with respect to the movement of the carriage, each tube being provided with a piezoelectric transducer selectively activable for expelling a drop of ink through a corresponding nozzle at predetermined printing positions in response to an electric signal, said tubes being placed in a hollow supporting structure and fixed to a pair of parallel spaced plates of said structure perpendicular to said tubes, the cavity of said structure being filled with a polymerizable resin, to form a single block with the plates, the tubes and the resin, the combination comprising a plurality of flexible conduits connected between an end of the tubes projecting beyond the back plate of said pair and an auxiliary ink reservoir, the conduits being supported by a fixed cylindrical drum mounted on the carriage and passed around the drum alternately in opposite directions for one and a half turns so as to minimize the axial space occupied by the conduits on the drum.

2. A printer according to claim 1 wherein the drum is mounted in a parallelepipedal container having a front plate disposed against the said back plate and short pieces of tubing projecting inside the container are fixed in alignment with the tubes through the front plate and the conduits are connected between the short pieces of tubing and the reservoir.

3. A printer according to claim 1, wherein the transducers are electrically connected to a printed circuit element disposed into said cavity of the structure perpendicularly to the tubes and traversed by said transducers, the printed circuit projecting from the resin block whereby the transducers are electrically accessible from outside.

4. An ink jet dot printer comprising a head mounted on a carriage movable with respect to a printing support and having a plurality of parallel ink ejecting tubes, in a plane so inclined with respect to the movement of the carriage that the vertical distance between the first and the last of the tubes, is equal to the maximum height of the characters to be printed, each tube being provided with a piezoelectric transducer selectively activable for expelling a drop of ink through a corresponding nozzle in predetermined printing positions in response to an electric signal, and a driving logic circuit for generating said electric signals comprising a memory for reading and writing information appertaining to the successive columns of dots of a matrix of the characters to be printed, addressing means connected to the memory and controlled by a control unit for addressing the information in predetermined address locations of said memory shifted from one another by a settable number of address locations, and an adder connected to said addressing means for adding said settable number of locations to the address location of the information of a generic column of dots to be printed, said adder being connected to an entering device for forcing into the adder said settable number of address locations whereby said addressing means address said column information in consecutive address locations in cyclic succession and said control unit permits the reading of column information of the dots to be printed at predetermined address locations shifted from one another by said settable number of locations.

5. A circuit according to claim 4, wherein the entering device comprises a selectively operable multiple manual switch.

6. A circuit according to claim 4, wherein when said settable number of address locations is equal to the number of printing positions the columns of dots are printed vertically and when the number of address locations is smaller or greater than the number of printing positions the column of dots are printed sloping in one direction or in the opposite direction, respectively, with respect to the vertical.

7. A circuit according to claim 4, wherein said memory is connected to a shift register through an output multiplexer to load a single bit at a time for each dot column information from said addressed locations into said shift register and for transferring said bits in parallel from said register to a transducer energizing circuit, said shift register being of the bidirectional loading type and controlled by an up-down counter in relation to one or the other direction of printing, and the binary information stored therein being arranged in one or the other of two mutually symmetrical bit sequences correlated respectively to the directions of printing.

8. Driving circuit for an on demand ink jet printer having a plurality of ink ejecting tubes mounted on a movable carriage and arranged in a plane inclined with respect to the movement of the carriage, each tube having a nozzle and a transducer to expell an ink droplet, said circuit comprising a character generator to generate character information representative of the character to be printed arranged in dot column patterns according to a predetermined matrix, a read-write memory for storing said information, addressing means connected to said memory and controlled by a control unit, to cyclically address said dot column information in selected address locations of said memory, an adder connected to said addressing means to add a selectable number to the serial number of any preceding address location and an entering dévice for forcing into said adder said selected number, whereby said dot column information is addressed at address locations shifted from one another by said selected number of locations.

9. Driving circuit according to claim 8, comprising an up-down counter to drive an output multiplexer for reading out from said addressed locations a single bit at a time for each dot column pattern stored at said shifted locations, and a shift register connected to said output multiplexer to serially receive said bits and to parallelly supply them to said transducers whereby said nozzles at each printing cycle will print simultaneously all the dots appertaining to said inclined line and to the columns of said matrix spaced by a number of print positions equal to said selectable number.

10. Driving circuit according to claim 9, wherein said entering device comprises a multiple switch to set said number in binary coded form.

11. Driving circuit as claimed in claim 9, wherein said nozzles are mutually spaced by a constant pitch including a predetermined number of printing positions and said selectable number of locations corresponds to said predetermined number of printing positions, whereby all the dots corresponding to each dot column pattern will be printed by said plurality of nozzles in a vertical alignment.

12. Driving circuit according to claim 9, wherein said selectable number of locations is greater or less than said predetermined number of printing positions, whereby all the dots corresponding to each dot column patterns will be respectively printed by said nozzles with a forward or backward slope with respect to the vertical.

13. An on demand ink jet printing head comprising an ink ejecting tube associated with a transducer selectively operable for expelling a drop of ink through a corresponding nozzle, said tube and said transducer being secured to a supporting structure, an ink reservoir carried by said structure, and ink conducting tube connecting said reservoir and said ejecting tube made of a flexible material and having a length greater than the distance between the ejecting tube and the reservoir, the improvement comprising a winding member carried by said structure between said ejecting tube and said reservoir, said member holding said ink conducting tube in a wound arrangement to reduce the dimension of said structure.

14. A printing head according to claim 13, wherein said structure is carried by a carriage movable with respect to a printing support, said reservoir being connected through a flexible conduct to a stationary ink tank, said structure including a plurality of ejecting tubes individually connected to said reservoir by an associated ink connecting tube of flexible material.

15. A printing head according to claim 14, wherein said supporting means comprises a cylindrical drum fixed to said structure parallely to the carriage movement, each conduit being wound around said drum for one and a half turns, so that it begins and ends respectively in two diametrically opposite positions with respect to the drum.

16. A printing head according to claim 15, wherein said conduits are wound around said drum so that each half turn of a winding coil left free by one of said conduits is occupied by the first half turn of an adjacent conduit, whereby the space occupied by the conduits in the axial direction on the drum is minimized.

17. An on demand ink jet printing head comprising a head mounted on a carriage movable with respect to a printing support and including an elongated ink ejecting tube associated with a transducer selectively operable for expelling a drop of ink through a corresponding nozzle, said tube and said transducer being placed in a hollow supporting structure and fixed to a pair of parallely spaced plates perpendicular to said tube, said plates defining a first cavity therebetween and an adjacent cavity, said first cavity being filled with a polymerizable resin to form a single block with said ejecting tubes, said plates and said resin, an auxiliary ink reservoir, fixed to the structure and connected to a stationary main ink tank, a flexible ink conducting tube for connecting said ejecting tube to said reservoir, said flexible tube having a length greater than the distance between said ejecting tube and said reservoir, and a supporting member placed into said adjacent cavity to hold said flexible conducting tube in a wound arrangement into said adjacent cavity, whereby the transverse dimension of said structure relative to the carriage movement is limited.

18. A printing head according to claim 17, wherein said ink ejecting tube has an end projecting beyond a back plate of said pair towards said adjacent cavity and said conducting tubes comprise at least one flexible conduit connected between said end and said auxiliary reservoir, said conduit being wound around said supporting means by at least one turn.

19. A printing head according to claim 17, comprising a plurality of parallel ink ejecting tubes lying in an inclined plane with respect to the carriage movement, each of said tubes having an end projecting beyond a back plate of said pair towards said adjacent cavity and said conducting means comprise a plurality of flexible ink conduits each connected between a corresponding end of said tubes and said auxiliary reservoir, said conduits being passed adjacent each other around said supporting means, alternatively in opposite directions for at least one turn.

20. A printing head according to claim 17, wherein said adjacent cavity is comprised in a container having a front plate, said container being removably attached to said block with said front plate facing a back plate of said pair, said front plate including hollow connecting means aligned with said ejecting tubes and having an end projecting beyond said front plate into said container, said conducting tubes being connected to said ends, whereby said container and said supporting member are removable from said block.

* * * * *